Dec. 20, 1938.      A. A. NICHOLS      2,140,966
ROTARY MECHANISM
Filed July 8, 1936     5 Sheets-Sheet 1

INVENTOR.
ARTHUR A. NICHOLS.
BY Mayer Goldman
ATTORNEY.

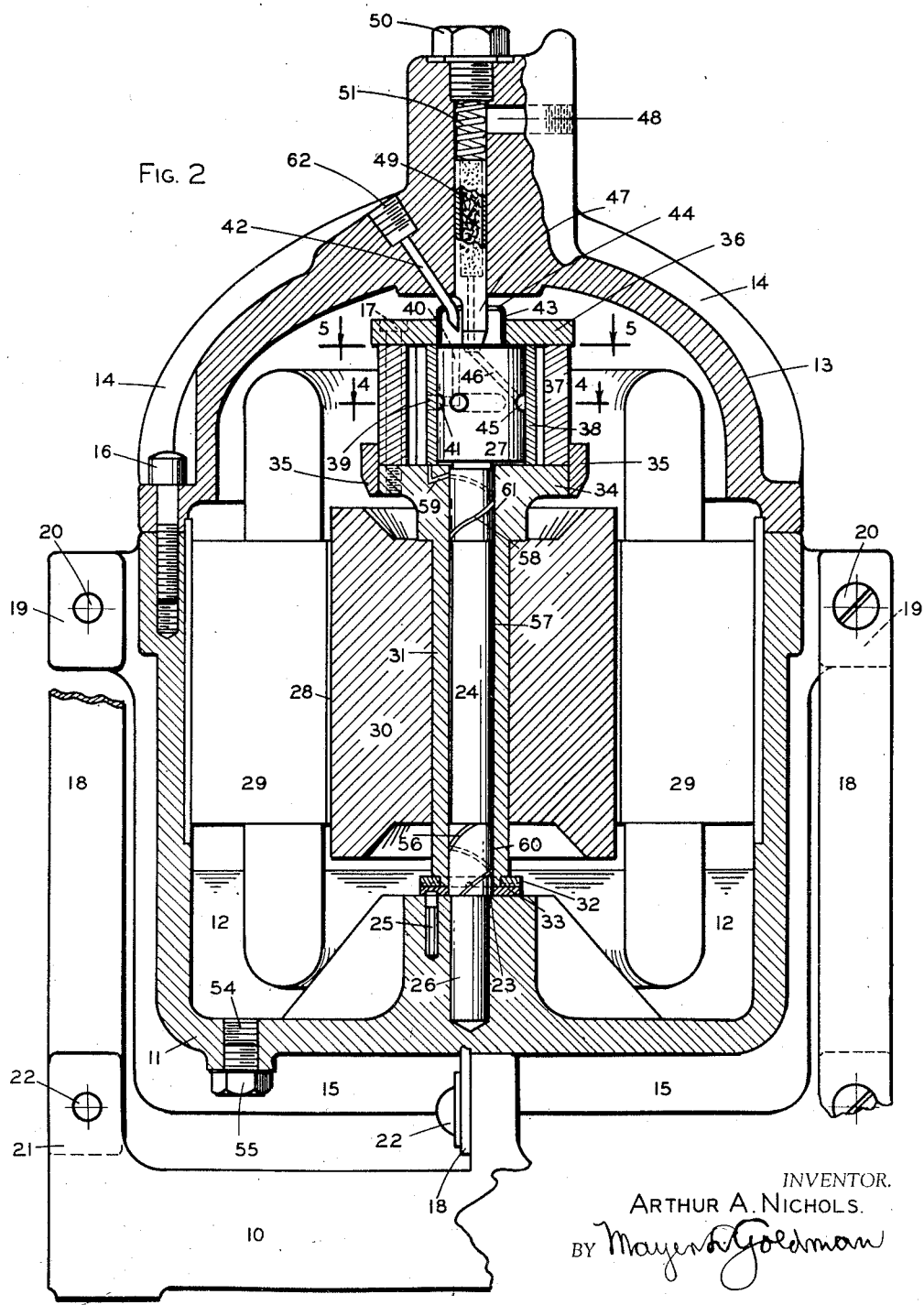

INVENTOR.
ARTHUR A. NICHOLS.
BY Mayer Goldman
ATTORNEY.

Dec. 20, 1938.　　　A. A. NICHOLS　　　2,140,966
ROTARY MECHANISM
Filed July 8, 1936　　　5 Sheets-Sheet 4
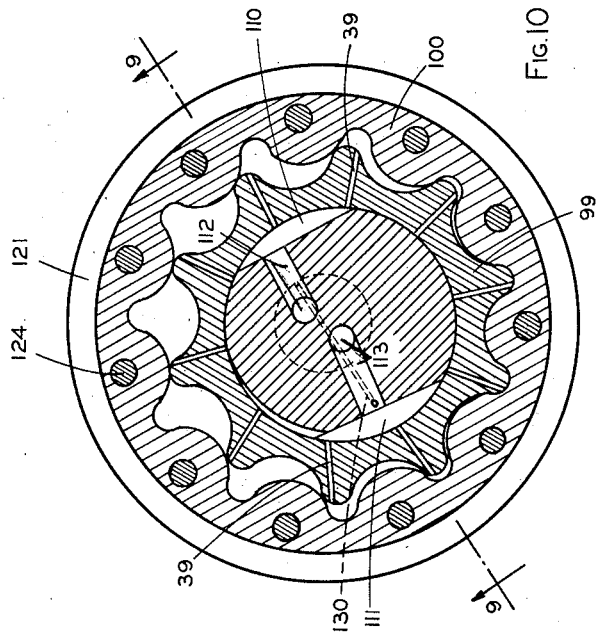
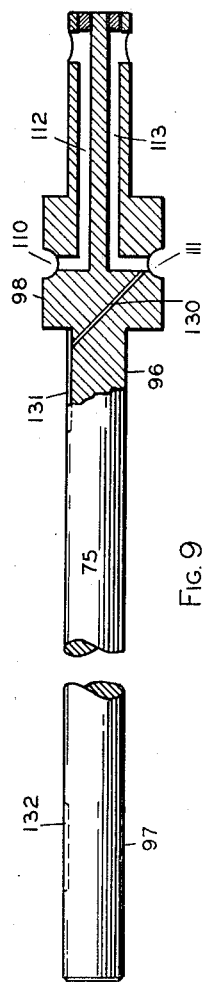
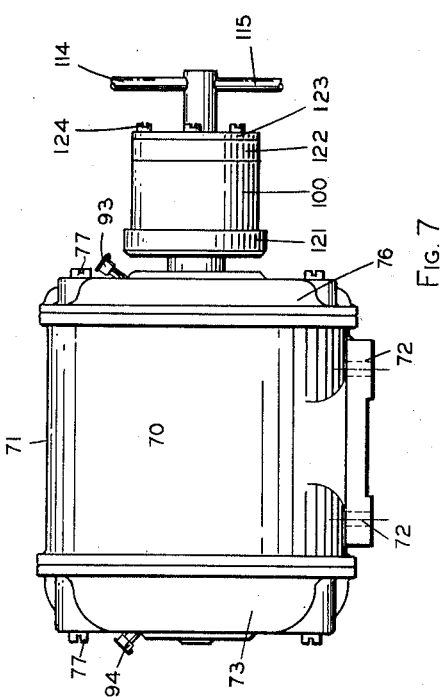
INVENTOR.
ARTHUR A. NICHOLS.
BY Mayer Goldman
ATTORNEY.

Dec. 20, 1938.  A. A. NICHOLS  2,140,966
ROTARY MECHANISM
Filed July 8, 1936   5 Sheets-Sheet 5

INVENTOR.
ARTHUR A. NICHOLS
BY Mayer S. Goldman
ATTORNEY.

Patented Dec. 20, 1938

2,140,966

UNITED STATES PATENT OFFICE 2,140,966

ROTARY MECHANISM

Arthur A. Nichols, Waltham, Mass.

Application July 8, 1936, Serial No. 89,626

8 Claims. (Cl. 230—141)

The invention relates to pumps, compressors and motors of the rotary type and particularly to those provided with rotary elements of the "Gerotor" type, comprising a pair of internal gears, of which the numbers of teeth differ by one and of which each tooth of each gear has continuous operative relation with at least one tooth of the other gear throughout their respective revolutions about eccentric axes forming therebetween closing and opening chambers performing pressure functions upon fluid supplied to them.

Whatever function the apparatus performs the general arrangement and co-operative relation of its parts will follow similar principles of operation as far as they apply to the essential features of the invention.

The object of the invention is to provide a pump or compressor of simple construction, of few moving parts, with no vibrating parts, with no considerable revolving eccentric masses and with a high quality of balance.

Another object is to reduce friction between the gears themselves and between the bearing surfaces, as well as to provide for an outer rotor free from all sliding or rubbing contact with any parts except the inner rotor teeth.

Another object is to provide against distortion of the parts due to heating from friction or from the natural heating of fluids due to physical action resulting from compression or of pumping.

Another object of the invention is to provide a pump or compressor having a fixed shaft with inlet and outlet, passages and ports therein so that assembly and proper timing of the ports with respect to the pump operation is determined and so that accuracy of relative position of the parts is maintained.

A further object of the invention is to provide a pump or compressor comprising a minimum of parts requiring high precision of manufacture.

A still further object of the invention is to provide for supercharging or boosting the fluid in process of compression by by-passing the clearance fluid remaining in the porting passages and clearance so that such fluid is delivered from a region of higher pressure to a region of intermediate pressure, increasing the efficiency of the device and its capacity.

These and other valuable objects of the invention will become apparent from a consideration of the description in the specification in connection with the drawings wherein preferred forms of the invention are shown as applied to a compressor and to a pump for liquids.
In the drawings:—

Fig. 2 is an enlarged view in vertical central section of Fig. 1, showing some parts in elevation;

Fig. 7 is a view in elevation of the device embodied in a liquid pump;

Fig. 9 is an enlarged broken detail view of the fixed shaft partly in elevation and partly in section on line 9—9 of Fig. 10;

Fig. 10 is an enlarged view in section, on line 10—10 of Fig. 8.

Figure 1:
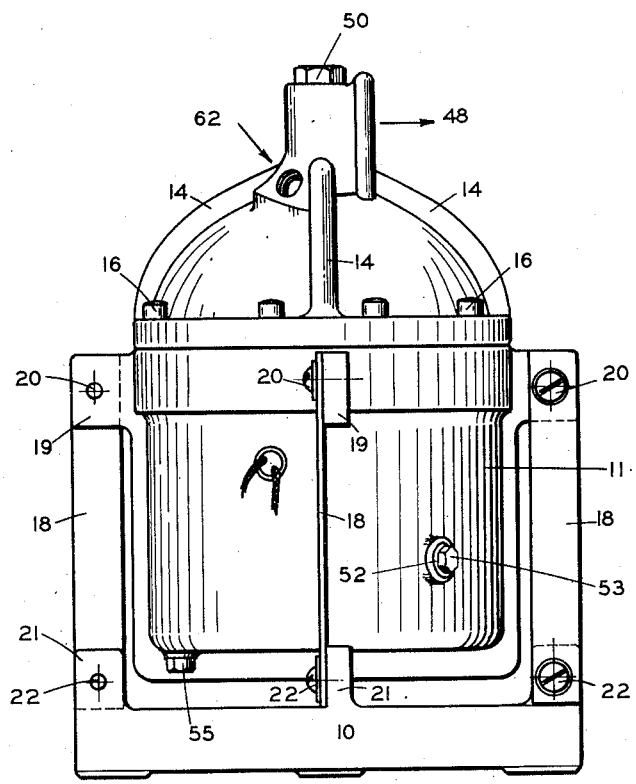
Fig. 1 is a view in elevation of the device embodied in a compressor.
Figure 3:
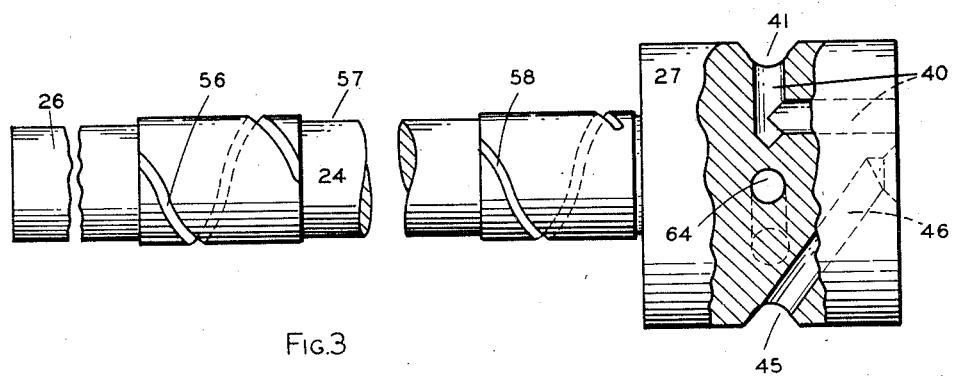
Fig. 3 is an enlarged detail view of the fixed shaft partly in elevation and partly in section.
Figure 4:
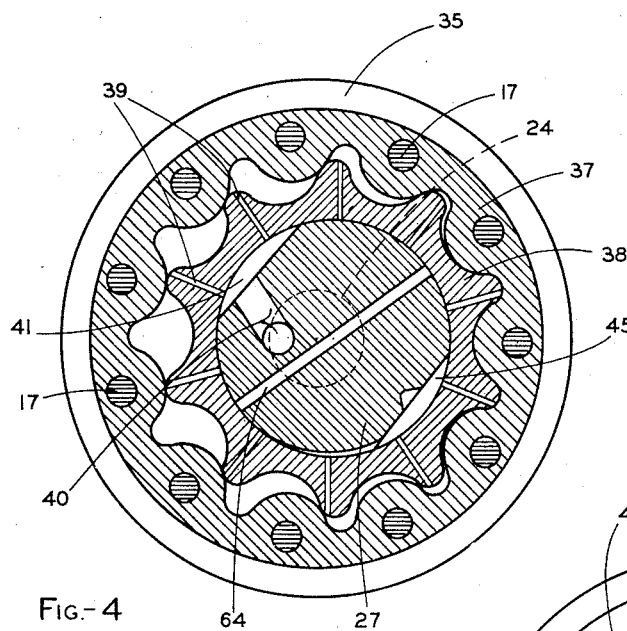
Fig. 4 is a horizontal broken mid-section view of the eccentrically disposed shaft portion with the rotors, along line 4—4 of Fig. 2;
Figure 5:
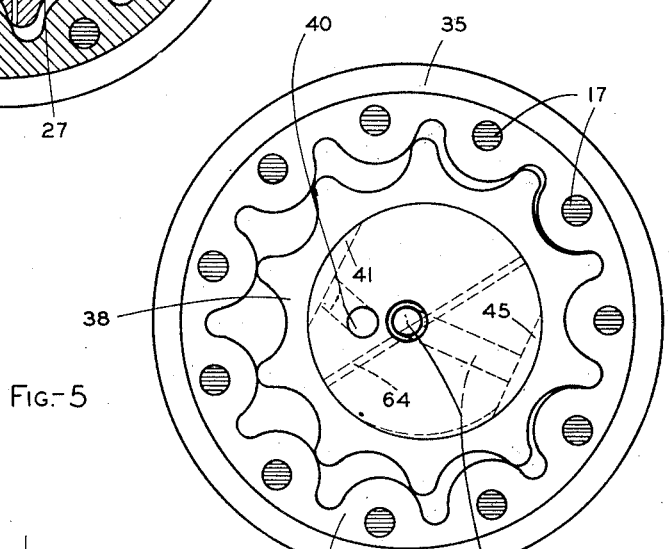
Fig. 5 is an enlarged view in section at the junction of rotors and cover disc ring on line 5—5 of Fig. 2, showing some details.

The compressor shown in the drawings, Figures 1 to 6, comprises a base plate 10, a lower section 11 of an outer casing, providing a reservoir 12 for oil or other lubricant, an upper section 13 of the outer casing, upper and lower sections being provided with ribs 14 and 15 respectively, which act as radiators of heat for this casing and also to strengthen it. The two sections are joined together by the cap screws 16. The casing is flexibly supported on the base by means of the flat, vertically disposed springs 18, which are fastened at one end to lugs 19 on the lower casing, by screws 20, and at the other end to lugs 21 on the base, by screws 22.

This arrangement provides for free restricted movement of the casing, reducing effects of sound or motion due to vibration.

At the lower inside portion of the lower casing a step 23 is provided, into which is press-fitted, in fixed relation thereto, a shaft 24. The shaft 24 has a reduced diameter at 26, so that a shouldered portion rests on the step. The upwardly projecting portion is enlarged at its upper portion 27, the enlarged portion providing an eccentric end to the shaft. The shaft provides bearing surfaces on its lower portion for a motor sleeve or quill and on its upper portion for the compressor rotor. The eccentricity of this upper portion of the shaft with respect to the lower portion is the same as the eccentricity of the two members of the "Gerotor" pair to which further reference will be made.

There is mounted within the outer casing, an electric motor 28, of which the stator 29 is fixed with respect to the casing. The rotor 30 of the motor is mounted on, and in fixed relation to, a bearing sleeve or quill 31, which is journalled upon the fixed shaft, and rests upon a thrust bearing washer 32, backed by an anti-friction washer 33, the washer 33 being located and maintained in position by the pin 25. Suitable grooves, substantially tangential to the shaft, in the upper and lower faces of the washer 33 admit lubricant to the shaft bearing surfaces by means of pressure differential between expanding chambers and inlet pressures. The portion of the quill toward its upper end is larger than the lower portion, affording a shoulder which the motor rotor contacts and is thereby positioned. The quill is still further enlarged at its upper end to form a backing plate 34, on which the outer rotor is fixed and supported, and on which the inner rotor rides. The ring 35, pressed to fit the quill, positions the outer rotor on the backing plate. A cover ring disc 36 is fixed to the outer rotor by means of cap screws 17 screwed into threaded holes in the backing plate, so that motor rotor, quill, outer "Gerotor" and cover ring disc revolve as a unit about the lower part of the central shaft which is concentric with these parts. The eccentric head 27 of the shaft is slightly shorter than the thickness of the inner rotor, sufficient clearance being thereby provided at the top and the bottom of the eccentric shaft head, so that the shaft head has no end contact with revolving parts therefore requiring no particular precision machining. The outer rotor 37 and inner rotor 38, comprise the rotary pumping elements of the device and are made in a peculiar manner and are known commercially as "Gerotors".

The outer "Gerotor" is made in ring form with internal teeth and tooth spaces; the inner rotor is made with external teeth and tooth spaces; the two rotors differ by one in the number of teeth and have each tooth of each rotor maintained in operative relation with at least one tooth of the other rotor at all times. This peculiar quality of these rotors is attained by making the theoretical contours of the teeth of the respective "Gerotors" the generated contours of the teeth of the other "Gerotor" whatever may be the form or profile of the tooth. It will be noted that this quality requires that the "Gerotors" be eccentrically disposed with respect to each other when in the operative relation, so that at passing full mesh, a tooth of the inner rotor is in instantaneous contact with two teeth of the outer rotor and each of the other teeth of either rotor is in operative relation with one tooth of the other rotor, so that the operative relation and tightness are continuously maintained.

While it is not strictly required, for proper operation, that the tooth spaces of the rotors be of such precise generated contour, the degree of such precise generation and the relative profiles of teeth will be predicated upon the nature of the fluids to be dealt with, the pressure to be provided and other conditions of operation and use.

Although I have described the particular type of gear tooth which I prefer, under certain conditions, other forms of teeth may be used to attain a result desired so that I do not desire to be limited to the specific form of tooth described, but my invention may be adapted to use with other forms and disposition of teeth.

Also by modifying the disposition and form of the rotatory pumping elements, the invention may be adapted to use with rotary pumping elements carrying vanes.

The inner rotor 38 is mounted revolubly upon the eccentric portion of the fixed shaft, the eccentricity of this eccentric portion being of the same magnitude as the eccentricity of the "Gerotors" in their mutually generated relative contours. When the rotating element of the motor is revolving with its attached parts the outer rotor drives the inner rotor in its eccentric position journalled upon the shaft head, opening and closing chambers between the teeth bounded by the upper ring disc and the lower backing plate. The inner rotor is provided with substantially radial passageways 39, one end of which is open to the bore of the inner rotor, the other end opening on the rearwardly disposed face of the advancing tooth.

The eccentric head of the shaft is provided with inlet passage 40 and inlet port 41. The fluid to be compressed is delivered to the inlet passage and port through the inlet tube 42 which debouches into an inverted cup 43 which forms a centrifuge or bonnet for the entering low pressure fluid, which passes to the port 41 and is delivered to the opening chambers between the rotor pair.

The rotors having passed the open mesh position the fluid is compressed as the rotors revolve toward the full mesh position and is delivered to the outlet port 45 and passageway 46 which are also within the eccentric shaft head and passes thence to the discharge tube 47 and to discharge outlet 48. The bonnet 43 is pressed into fixed relation to the ring disc and revolves therewith, so that lubricant entering with the incoming fluid contacts this bonnet, is centrifuged and lubricates the bearing of the inner rotor on the eccentric shaft head and the other working faces of the rotating parts. The amount of lubricant thus supplied may be governed by the extent of the inwardly extending lip 44 of the bonnet. The lower half of the inner rotor bearing and rotors is lubricated by lubricant passing upward in the oil grooves in the shaft and the connected passageways.

The inner rotor, which is journalled on the eccentric head and is driven by the outer rotor, travels at a greater number of revolutions on its own axis than the outer rotor, proportional to the numbers of teeth on the two rotors, so that, as the rotors revolve, if the outer rotor has $n$ teeth and the inner rotor $n-1$ then the revolutions of the inner rotor with respect to the outer rotor is $$\frac{1}{n-1}$$

while its revolutions with respect to the shaft is $$\frac{n}{n-1}$$

Thus, for example, if the outer Gerotor driven by the motor turns at 1750 revolutions per minute and the number of teeth of the outer Gerotor is 11 and the number of teeth of the inner Gerotor is 10, then the inner Gerotor will turn $$\frac{11}{10}$$

of 1750 or 1925 revolutions per minute, but as the two rotors turn in mesh with one another, the difference is 175 revolutions per minute which is the speed at which the sides of the inner rotor slide over the bounding faces on the quill and on the disc ring. It will be seen that such a comparatively slow movement lends itself to the maintenance of extremely low clearances on these contacted moving parts, resulting in low gas leakage across such contacted faces.

The lower end of the discharge tube 47 is of inverted conical frustum shape and fits into a corresponding conical bore in the eccentric shaft head in gas tight relation thereto. The discharge tube passes through the inverted cup 43 and thence fits slidingly into a bore 49 in the casing. This bore is threaded at its outer end and fitted with a cap screw 50 to close it. A spiral spring 51, of adequate strength, is positioned within the bore below the cap screw and in contact therewith, the other end of the spring is contacted with the outer end of the discharge tube which, by reason of its sliding fit in the bore, is maintained in gas tight relation with the shaft. When through heat or other force, there occurs differential expansion of the parts, distortion or other change in position of the parts of the device, any displacement in the axial direction is fully compensated for by this arrangement of parts without undue stress or strain and at the same time the gas tight relation is assured and the discharge tube also acts as centering or supporting means for the fixed shaft. The counterbore in the discharge tube is lightly packed with wool or other exhaust noise deadening material. The extensive contact of the outer surface of the discharge tube with the face of the bore in the casing tends to make a gas tight joint to prevent leakage into the casing.

In operation, the casing is supplied with the required lubricant, as, for instance, oil through the fill hole 52, closed by cap screw 53. Provision is made for emptying the oil from the reservoir 12 by means of the drain 54, closed by the drain cap 55. Lubricant is supplied up to a level somewhat below the motor rotor, a lubricant being used which is insoluble in, and without chemical action upon, the fluid to be compressed. When the rotor revolves, the lubricant is carried by differential pressure and by capillary attraction aided by a shearing and plowing effect, brought about by the direction of the oil grooves with respect to the rubbing surfaces, into the spiral channel 56, of the shaft and thence to the clearance space 57 between the bearings and the spiral channel 58, and to the rotor chambers by the passageway 59. The oil there mingles, in a more or less atomized form, with the fluid to be compressed and a portion of it passes out of the compressor by way of the discharge tube along with the compressed fluid and may then be separated out and returned in a well known way to the reservoir 11, in the casing.

The bearings 60 and 61 are as widely separated as may be and are lubricated by the oil in its passage upward in the oil passages and channels referred to.

The inlet 62 for the fluid passes through the casing and is suitably threaded to receive a supply conduit. The inlet tube 42 projects into the centrifuge or bonnet, from which the inlet passage 40 and port 41 lead to the opening pump chambers. The opening of the inlet tube is so positioned that it does not lie opposite to the inlet passage in the shaft, so that any lubricant drip will lie on the face of the eccentric shaft head and will enter the bonnet but not in registry with the inlet passage.

The radial passageways 39 in the inner rotor, it will be noted, pass successively in registry with the open peripheral inlet port 41, so that the fluid enters through them into the expanding rotor chambers. The chambers having passed the port, and the open mesh position, the closing of the chambers as they approach full mesh, gradually increases the pressure therein, until the diminishing chambers are in communication with the outlet port by the registry of the end of their radial passages with that port. The compressed fluid passes out of the pump through the discharge tube and connection, into a reservoir, pipe or other receiver whereby, or wherein, the pressure limit is controlled in well known manner.

As the pumping operation proceeds, it will be noted that, the chambers having discharged their compressed fluid, there will remain in the radial passages in the inner rotor, a residual amount of fluid under compression, which is carried along with the inner rotor. This fluid which is in process of expanding as the chambers advance toward the open mesh position is utilized to boost the pressure in the contracting chambers on the pressure side, the passageway 64 in the eccentric shaft head providing a by-pass communication between the expanding chambers on the one side, and the contracting chambers on the other in such a manner that the high pressure gas in the radial passageways is received into the by-pass passageway and delivered to the contracting chambers at an intermediate pressure. This increases the amount of gas in the compression chambers and adds to the efficiency of the pump and also reduces the amount of clearance gas carried around on the open mesh side.

The compressor may, if desired, be cooled by a circulating liquid in a jacket or by air blasts.

Figure 6:
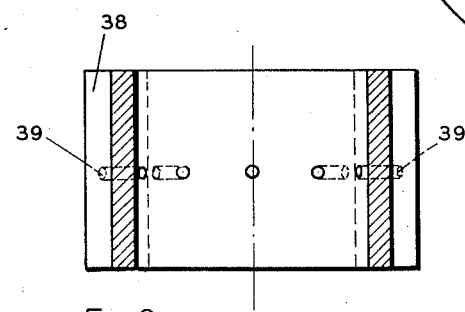
Fig. 6 is a view in vertical central section of the inner rotor. This view also shows the inner rotor 15 for the modification shown in Figs. 7 to 11 inclusive.
Figure 8:
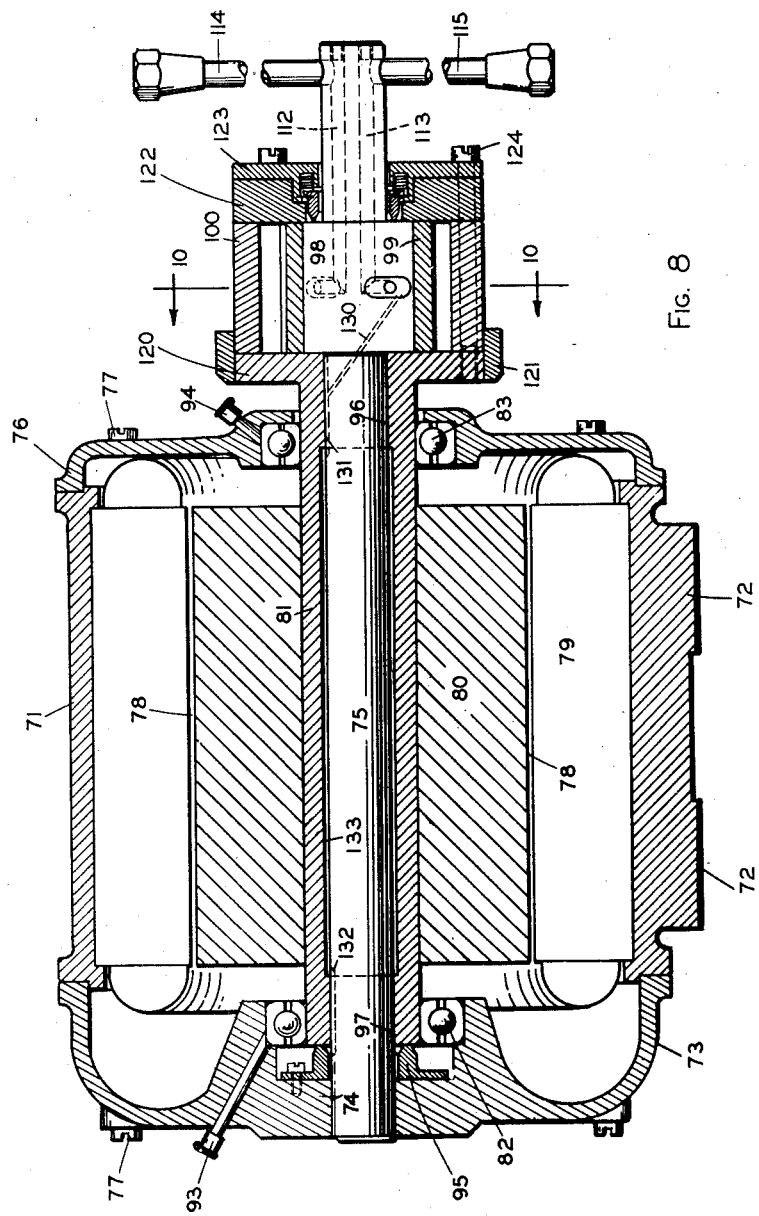
Fig. 8 is an enlarged view in central section of Fig. 7 showing some parts in elevation.

Another embodiment of the invention adapted for use as a liquid pump is shown in Figures 6 to 10 inclusive. Figure 6 shows the inner rotor of this modification which is the same as the inner rotor for the compressor. The casing 70 comprises a central body portion 71, with extensions 72 forming a base for the pump, a bell end portion 73 with a central bore 74 into which the fixed shaft 75 is lightly press fitted; and another end portion 76 through which the shaft 75 projects. The three parts of the casing are joined together by the screws 77. The electric motor 78 has its stator 79 positioned within the casing, the rotating part 80 of the motor, is fixed on the quill 81 so that they revolve together. Ball bearings 82 and 83 are provided toward each end of the quill for its external journalling surfaces and the bearings are mounted in the casing end portions. Lubricant is supplied to the ball bearings at the cups 93 and 94. At one end, the quill bears on a thrust and liquid sealing member 95. The fixed shaft journals the quill 81 at 96 and 97. This shaft is enlarged toward its free end, providing an eccentric portion 98 with respect to the portion on which the quill is journalled. This eccentricity corresponds to the eccentricity of the inner and outer Gerotor members, respectively 99 and 100. Beyond this eccentric portion, the shaft extends outwardly in axial coincidence with the portion on which the quill is journalled. The eccentric portion of the shaft is provided with inlet and outlet ports, respectively 110 and 111, and with inlet and outlet passageways 112 and 113 extending outwardly. At the outward end of these passageways, they connect with inlet and outlet tubes 114 and 115, respectively, adapted for connection to inlet and discharge piping for inlet and discharge of the liquid to be pumped.

The outer portion of the quill is enlarged at 120 providing a seat for the outer rotor 100, which is centered by the centering ring 121. The cover plate 122 and the liquid seal 123 are fixed to the outer rotor; the liquid seal, cover plate and outer rotor being fastened together to the enlarged portion of the quill by the screws 124 so that all revolve as a unitary structure. The liquid seal 123 seals the outer portion of the shaft at its eccentric portion.

The inner rotor 99 is mounted for rotation upon the eccentric portion of the fixed shaft and in mesh with the outer rotor so that the inner rotor revolves with it, maintaining its relation of continuous liquid tightness for the chambers formed by the rotor teeth, the quill and the cover plate. The thickness of the eccentric portion of the fixed shaft is slightly less than the thickness of the inner rotor so that no high precision of machining is required for it and friction is lessened. The inner rotor is provided with substantially radially disposed passageways 39, Figure 6, by means of which communication is established between the ports in the eccentric portion of the fixed shaft, the pump chambers and the inlet and outlet passageways. The rotors, as they revolve, cause this communication to be established successively continuously, the pressure of the liquid being controlled by the location of the ports and by the resistance opposed to outward flow by valves, mechanisms or other resistance opposed to the outward flow. The liquid enters the pump through the inlet, inlet passageways and port, the radial passageways in the inner rotor and thence to expanding pumping chambers. The rotors having passed the open mesh position, the chambers contracting, cause pressure in the liquid and it issues from the contracting chamber by the radial passageways in the inner rotor, outlet port and outlet passageways to the discharge piping.

A certain amount of clearance liquid will be constantly carried around in the passageways and in the clearance space between the rotors, the volume of this clearance liquid being measured by the volume of the total clearance, which is held to a practicable minimum.

No special cooling device is required with such a pump except in unusual conditions. Lubricant is supplied to the ball bearings by means of the lubrication tubes 93 and 94 in the usual manner, and is supplied to the journalled surfaces of the quill and the fixed shaft by means of lubricant passageway 130 from the eccentric portion of the shaft head to passageway 131 in the journal. The quill is counterbored at 133 providing a passageway for lubricant between the fixed shaft and the quill to lubricant passageway 132 for the lubrication of the more remote journal. The lubricant is provided for by the liquid pumped. The liquid seal 95 functions at the far end of the quill on which the rotating part of the motor is mounted.

No special cooling device is required with such a pump except in unusual conditions, nor is any booster passage required. The entire clearance space, however, is reduced to a minimum as stated.

Although I have shown and described the invention as applied to a pump or a compressor, it is adapted to be applied to a fluid motor by providing a supply of fluid under pressure to turn the "Gerotor" elements in reverse direction and by providing means to utilize the propulsion of the outer rotor in a useful manner.

The bearings in any of the devices may be plain metal to metal type bearings or they may be of the roller or ball bearing type.

It is understood that the invention may be modified in various ways, and various forms of casing may be utilized without departing from the spirit or the scope of the invention as set forth herein and claimed.

What is claimed and desired to be secured by Letters Patent of the United States is:—

1. In a rotary mechanism dealing with fluid movement, a stationary shaft having an eccentric portion, a quill journalled upon said shaft, an electric motor having its rotor member fixed upon said quill, an inner toothed rotor within an outer toothed rotor, cover means over the ends of said toothed rotors, said toothed rotors being adapted for relative rotation and forming during said rotation chambers of alternately increasing and decreasing volume whereby fluid movement is effected, said chambers being bounded by the teeth and the walls of the tooth spaces of said toothed rotors and by said cover means and one of said toothed rotors being fixed upon said quill and the other toothed rotor being journalled upon the eccentric portion of said stationary shaft, inlet means for fluid to said chambers, outlet means for fluid from said chambers, passageways through said inner toothed rotor for movement of fluid between said chambers and said inlet means and between said chambers and said outlet means, and a by-pass through the eccentric portion of said stationary shaft and having its termini at the periphery of said stationary shaft, said termini being disposed to successively register with pairs of said passageways simultaneously as said inner toothed rotor revolves about said stationary shaft and thereby effect pressure communication between an expanding chamber and a contracting chamber in a region of intermediate pressure.

2. The combination claimed in claim 1, wherein the simultaneous registration between pairs of said passageways and the termini of the by-pass through said stationary shaft occurs when the chamber in communication with one of each pair of passageways is expanding and within a travel space of twice the tooth pitch from full mesh and when the chamber in communication with the other of the same pair of passageways is contracting and within a travel space of twice the tooth pitch from open mesh.

3. In a rotary mechanism dealing with fluid movement, a stationary shaft having an eccentric portion, a quill journalled upon said shaft, an electric motor having its rotor member fixed upon said quill, a pair of rotor members, one within the other, cover means over the ends of said pair of rotor members, said rotor members being adapted for relative rotation and forming during said rotation a plurality of chambers of alternately increasing and decreasing volume whereby fluid movement is effected, said chambers being bounded by said rotor elements and by said cover means, one rotor being fixed upon said quill and the other rotor journalled upon the eccentric portion of said shaft, inlet and outlet means for fluid to and from said chambers, passageways through said inner rotor for movement of fluid between said chambers and said inlet and outlet means, and a by-pass through said eccentric portion of said stationary shaft and having its termini at the periphery of said stationary shaft, said termini being disposed to successively register with pairs of said passageways simultaneously as said inner rotor revolves about said stationary shaft and thereby effecting pressure communication between an expanding chamber and a contracting chamber in a region of intermediate pressure.

4. The combination claimed in claim 3 wherein the simultaneous registration of pairs of said passageways and the termini of the by-pass through said stationary shaft occurs when the chamber in communication with one of said pair of passageways is expanding and within a travel space of twice the chamber pitch from full mesh and when the chamber in communication with the other of the said pair of passageways is contracting and within a travel space of twice the chamber pitch from full mesh.

5. In a rotary mechanism dealing with fluid movement, a casing, a stationary shaft having an eccentric portion, a quill journalled upon said shaft, an electric motor within said casing, the rotor member thereof fixed upon said quill, a pair of intermeshing toothed rotor members, one within the other, adapted for relative rotation and providing therebetween chambers for fluid whereby fluid movement is performed, the outer rotor member fixed upon said quill, the inner member journalled upon said eccentric portion of said shaft, inlet and outlet ports and passageways and a by-pass passageway in said eccentric portion of said shaft whereby pressure communication is established between an expanding chamber and a contracting chamber in regions of intermediate pressure at a peripheral distance greater than one chamber space from full mesh, said inner rotor provided with open substantially radial passageways in the teeth thereof whereby said ports, passageways and bypass are successively placed in communication with said chambers for fluid passage upon rotation of said rotors.

6. The combination claimed in claim 5 wherein the pair of toothed rotor members consists of two rotors, one within the other, differing by one tooth, the contours of the contacting faces of said toothed rotors having a mutually generative relation whereby the teeth of one rotor are at all times in fluid tight relation with the teeth of the other rotor forming fluid tight chambers.

7. In a fluid compressor, a gas tight casing, providing a receiver for low pressure fluid, a stationary shaft having an eccentric portion, a quill journalled upon said shaft, an electric motor within said casing, the rotor member of said motor fixed upon said quill, a pair of intermeshing toothed rotors, one within the other, the tooth divisions thereof forming therebetween chambers expanding and contracting to perform fluid compression, end sealing means for said chambers, one rotor member of said pair fixed upon said quill, the other rotor member journalled upon said eccentric portion of said stationary shaft, inlet and outlet ports and passageways and a by-pass passageway establishing pressure communication between an expanding chamber and a contracting chamber in a region of intermediate pressure at a peripheral distance greater than one chamber space from full mesh, a centrifuge bonnet within said receiver providing an open inlet cup into which mixed low pressure fluid and lubricant are introduced directly for delivery to said passageways, ports and rotor chambers and means for placing said passageways, ports and bypass successively in communication with said chambers for fluid passage upon rotation of said rotors.

8. The combination claimed in claim 7, provided with a yieldably mounted outlet tube comprising a sleeve slidably mounted within said casing and extending into said inlet bonnet and cooperating with the outlet passageway in the fixed shaft thereby providing an exit passageway from the casing for the compressed fluid.

ARTHUR A. NICHOLS.